(12) United States Patent
Rangan et al.

(10) Patent No.: US 9,647,921 B2
(45) Date of Patent: May 9, 2017

(54) STATISTICS AND FAILURE DETECTION IN A NETWORK ON A CHIP (NOC) NETWORK

(75) Inventors: Venkat Rangan, San Diego, CA (US); Jeffrey A. Levin, San Diego, CA (US); Rodolfo G. Beraha, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 632 days.

(21) Appl. No.: 13/568,810

(22) Filed: Aug. 7, 2012

(65) Prior Publication Data

US 2014/0043962 A1 Feb. 13, 2014

(51) Int. Cl.
*H04L 12/26* (2006.01)
*H04L 12/24* (2006.01)
*G06F 15/78* (2006.01)

(52) U.S. Cl.
CPC ........ *H04L 43/106* (2013.01); *G06F 15/7825* (2013.01); *H04L 41/0659* (2013.01); *H04L 41/0668* (2013.01); *H04L 43/04* (2013.01); *H04L 43/0852* (2013.01); *H04L 43/10* (2013.01); *H04L 43/50* (2013.01)

(58) Field of Classification Search
CPC ............... H04L 41/0668; H04L 43/106; H04L 43/0852; H04L 43/04; H04L 43/50; H04L 41/0659; H04L 43/10; G06F 15/7825
USPC ........................................ 370/228, 252, 410
See application file for complete search history.

(56) References Cited

U.S. PATENT DOCUMENTS

| | | | |
|---|---|---|---|
| 6,198,728 | B1 | 3/2001 | Hulyalkar et al. |
| 7,969,985 | B1 | 6/2011 | Cline et al. |
| 2009/0252171 | A1 | 10/2009 | Kumar et al. |
| 2009/0300292 | A1 | 12/2009 | Fang et al. |
| 2011/0060831 | A1 | 3/2011 | Ishii et al. |

OTHER PUBLICATIONS

Madduri et al., "A Monitor Interconnect and Support Subsystem for Multicore Processors", University of Massachusetts, pp. 1-6, 2009.*
Rouse, "Round-Trip Time (RTT) Definition", TechTarget, pp. 1-3, Apr. 2007.*
Ciordas C., et al., "Transaction Monitoring in Networks on Chip: The On-Chip Run-Time Perspective", Industrial Embedded Systems, 2006. IES '06. International Symposi um on, IEEE, PI, Oct. 1, 2006 (Oct. 1, 2006), pp. 1-10, XP031086715, ISBN: 978-0-7803-9759-0 the whole document.

(Continued)

*Primary Examiner* — Jung Park
*Assistant Examiner* — Albert Shih
(74) *Attorney, Agent, or Firm* — Linda G. Gunderson

(57) ABSTRACT

Certain aspects of the present disclosure support techniques for collecting system information in a network on a chip (NoC). A dedicated packet may be transmitted from a source node to a destination node. As it traverses through the NoC, the dedicated packet may collect information from various nodes, which may be made available by the destination node. The collected information may be used in an effort to detect failures and collect statistics regarding the NoC.

36 Claims, 5 Drawing Sheets

(56) References Cited

OTHER PUBLICATIONS

Fiorin L., et al., "MPSoCs run-time monitoring through Networks-on-Chip", Design, Automation&Test in Europe Conference&Exhibition, 2009. Date '09, IEEE, Piscataway, NJ, USA, Apr. 20, 2009 (Apr. 20, 2009), pp. 558-561, XP032317554 DOI: 10.1109/Date.2009.5090726 ISBN: 978-1-4244-3781-8 the whole document.

"International Search Report and Written Opinion—PCT/US2013/053293—ISA/EPO—May 30, 2015".

Tedesco L., et al., "A message-level monitoring protocol for QoS flows in NoCs", System on Chip (SOC), 2010 International Symposium on, IEEE, Piscataway, NJ, USA, Sep. 29, 2010 (Sep. 29, 2010), pp. 84-88, XP031793033, ISBN: 978-1-4244-8279-5 abstract figure 2.

Beraha, et al., "The design of a latency constrained, power optimized NoC for 4G SoC." Proceedings NOCS '09 Proceedings of the 2009 ACM/IEEE International Symposium on Networks-on-Chip, p. 86.

Berman, et al., "Low-Overhead Error Detection for Networks-on-Chip," ICCD 2009, IEEE International conference on Computer Design, 2009, pp. 219-224.

Grecu, et al., "Essential Fault-Tolerance Metrics for NoC Infrastructures," 13th IEEE International On-Line Symposium (IOLTS 2007), pp. 37-42.

Park, et al., "Exploring Fault-Tolerant Network-on-Chip Architectures," Dept. of Comput. Sci. & Eng., Pennsylvania State Univ., University Park, PA. This paper appears in: Dependable Systems and Networks. 2006. DSN 2006. International Conference on Issue Date: Jun. 25-28, 2006, on pp. 93-104.

Pigging, Wikipedia: http://en.wikipedia.org/wiki/Pigging.

Vellanki, et al., "Quality-of-Service and Error Control Techniques for Mesh based Network-on-Chip Architectures," Journal Integration, The VLSI Journal—Special issue: ACM great lakes symposium on VLSI, vol. 38 Issue 3, Jan. 2005, pp. 353-382.

Taiwan Search Report—TW102127984—TIPO—Apr. 23, 2015.

* cited by examiner

STATISTICS AND FAILURE DETECTION IN A NETWORK ON A CHIP (NOC) NETWORK

BACKGROUND

Field

Certain aspects of the present disclosure generally relate to collecting system information in a network on a chip (NoC) and, more particularly, to collecting information from various nodes in the NoC as a dedicated packet traverses from a source node to a destination node.

Background

NoCs provide a way of interconnecting blocks (e.g., nodes) using a packet based network. In a NoC system, nodes including, for example, processor cores, memories, and IP blocks exchange data using a network as a mode of transportation of traffic. NoCs have many point-to-point data links interconnect by routers such that messages may traverse between nodes (e.g., from a source node to a destination node) over several links, by making routing decisions at the links.

SUMMARY

Certain aspects of the present disclosure provide a method for collecting system information in a NoC comprising a plurality of interconnected processing nodes. The method generally includes transmitting a dedicated packet from a source node to a destination node, collecting information from various nodes in the NoC as the dedicated packet traverses a route from the source node to the destination node, and making the collected information available by the destination node.

Certain aspects of the present disclosure provide an apparatus for collecting system information in a NoC comprising a plurality of interconnected processing nodes. The apparatus generally includes means for transmitting a dedicated packet from a source node to a destination node, means for collecting information from various nodes in the NoC as the dedicated packet traverses a route from the source node to the destination node, and means for making the collected information available by the destination node.

Certain aspects of the present disclosure provide an apparatus for collecting system information in a NoC comprising a plurality of interconnected processing nodes. The apparatus generally includes a processing unit configured to transmit a dedicated packet from a source node to a destination node, collect information from various nodes in the NoC as the dedicated packet traverses a route from the source node to the destination node, and make the collected information available by the destination node.

Certain aspects of the present disclosure provide a computer-program for collecting system information in a NoC comprising a plurality of interconnected processing nodes. The computer-program product comprises a non-transitory computer-readable medium having instructions executable to transmit a dedicated packet from a source node to a destination node, collect information from various nodes in the NoC as the dedicated packet traverses a route from the source node to the destination node, and make the collected information available by the destination node.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Network Topology

Figure 1:
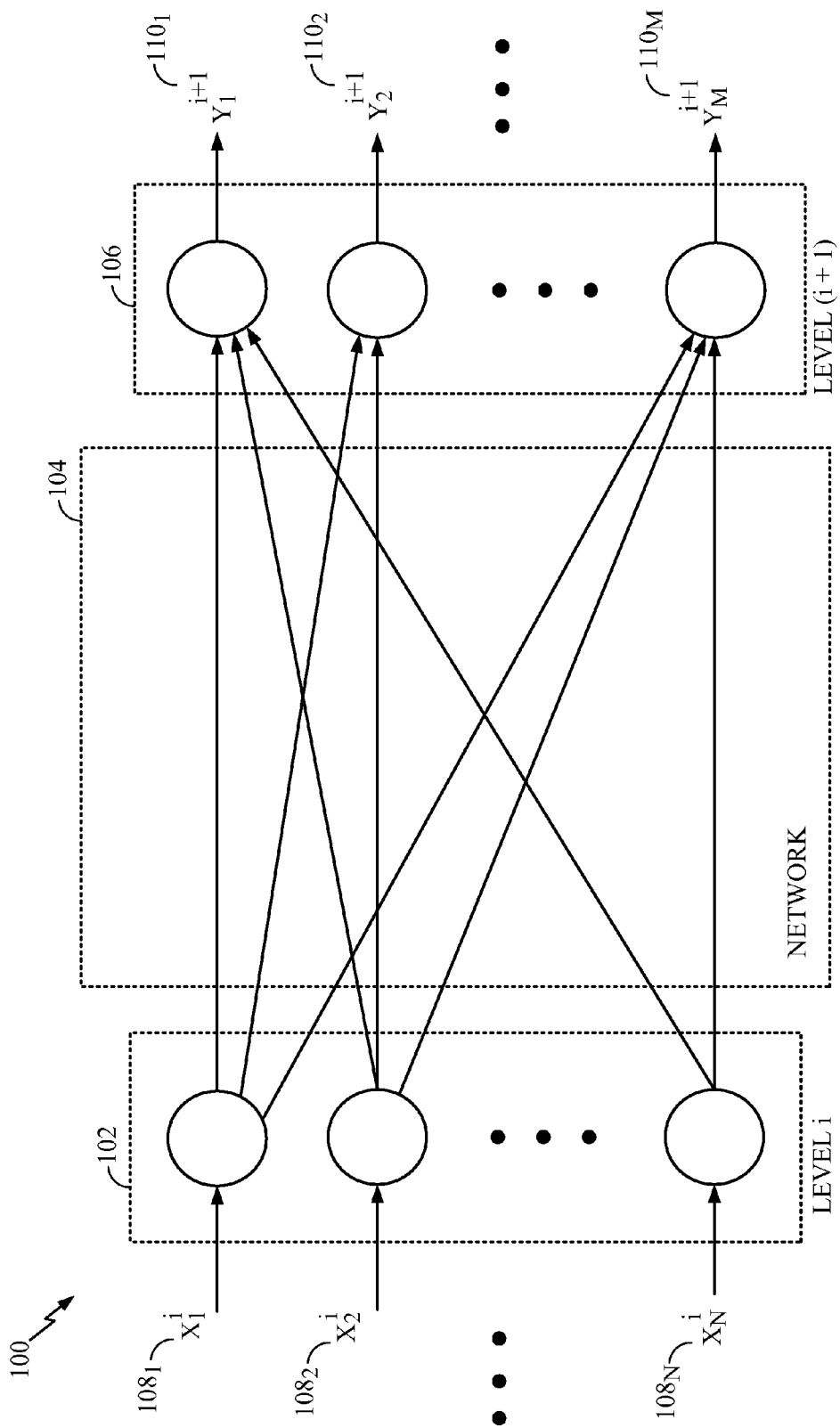
FIG. 1 illustrates an example distributed network in accordance with certain aspects of the present disclosure.

FIG. 1 illustrates an example network topology 100 of a NoC, in accordance with certain aspects of the present disclosure. The network topology 100 may comprise a level of nodes 102 connected to another level of nodes 106 though a network of connections 104. For simplicity, only two levels of nodes are illustrated in FIG. 1, although fewer or more levels of nodes may exist.

Each of the nodes in level 102 may receive one or more input signals 108 that may be generated by a plurality of nodes of a previous level (not illustrated in FIG. 1). The transfer of traffic from one level of nodes to another level of nodes may be achieved through the network of connections 104, as illustrated in FIG. 1.

Output from nodes in level 102 may be inputs for nodes in other levels including, for example, nodes of level 106. The output 110 of nodes of level 106 may be then transferred to another level of neurons using network connections (not shown in FIG. 1). As will be explained in more detail below, aspects of the present disclosure provide techniques for collecting statistics and determining failures for a NoC.

Statistics and Failure Detection in a NoC Network

NoCs may contain a plurality of interconnected nodes. While individual nodes may have knowledge regarding resources (e.g., bandwidth) they consume, the network may be unaware of happenings on each link of the network.

As the complexity of integrated systems continues to grow, detecting errors may provide an economical and efficient way to handle errors in a NoC as compared to attempting to design errors out of the network. Failure detection and network-level statistics may be used, for example, for load leveling, to improve throughput, and to determine system health of a NoC.

According to aspects of the present disclosure, a dedicated packet may methodically collect information from intermediate nodes as it travels through a NoC. Dedicated packets may be sent by the NoC according to a schedule, in an effort to periodically monitor the network.

As the dedicated packet traverses the NoC, nodes aware of the packet may modify the payload of the dedicated packet (e.g., by appending and/or prepending information to the payload of the packet). The nodes may append any type of information that may be used to detect failures and determine operating statistics of the NoC. Types of information that processing nodes may append or prepend to the dedicated packet may include run time statistics, queue utilization, node delays, path delays, etc. The network may use the collected information in an effort to make high-level network decisions.

Figure 2:
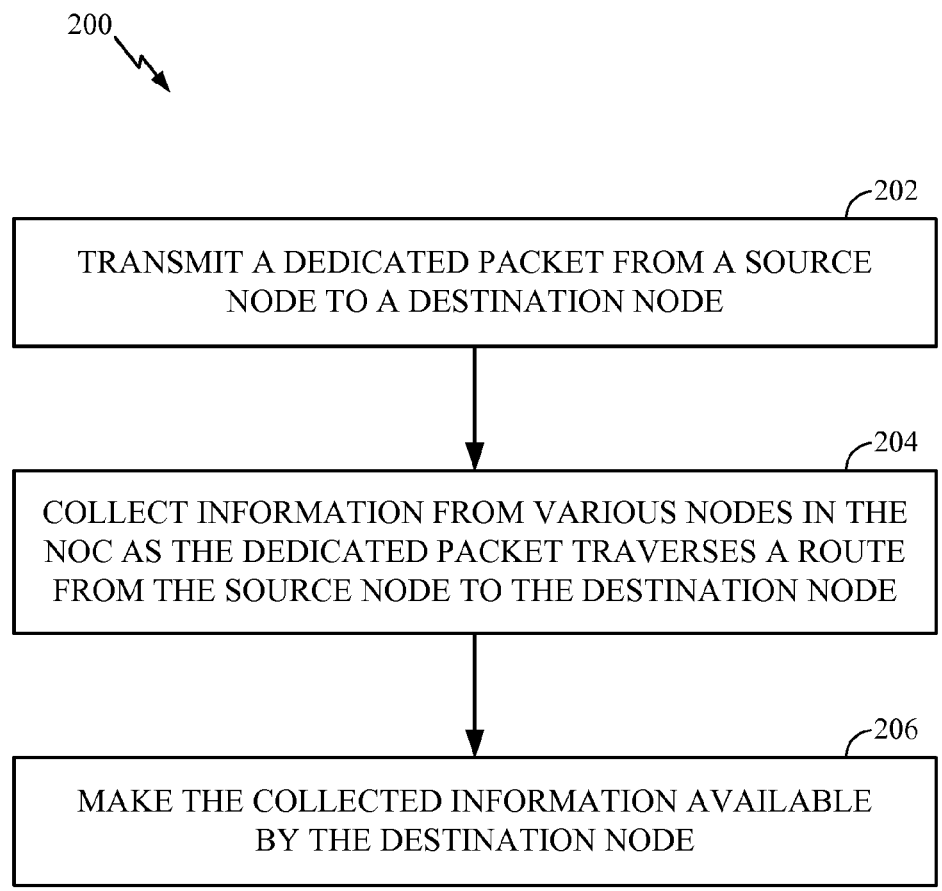
FIG. 2 illustrates example operations for collecting system information in a NoC in accordance with certain aspects of the present disclosure.

FIG. 2 illustrates example operations 200 for lightweight, scalable statistics and failure detection in a NoC containing a plurality of interconnected processing nodes (e.g., nodes of levels 102 and 106 of FIG. 1), according to aspects of the present disclosure.

At 202, a network may transmit a dedicated packet from a source node to a destination node. At 204, the network may collect information from various nodes in the NoC as the dedicated packet traverses a route from the source node to the destination node. At 206, the network may make the collected information available by the destination node. According to aspects, the operations may include demarcating one or more traffic flows in the NoC.

As will be described in more detail herein, various processing nodes may add their own information to the dedicated packet as it traverses a route in the NoC. For example, each processing node along the route of the dedicated packet may modify the payload of the dedicated packet. Modifying may include nodes pre-pending or appending their own information to the payload of the dedicated packet. This information may include queue statistics, utilization per link, bandwidth consumption, processing time, the number of packets that have passed through the node since a previous dedicated packet passed through the node, etc.

According to aspects of the present disclosure, timestamps may be added by a source node and/or one or more of the various nodes. The timestamps may be used to determine one or more path delays between nodes. In addition, timestamps may be used in an effort to determine a traversal time of the dedicated packet from the source node to the destination node.

After traversing its route, the destination node may send the dedicated packet back to the source node. Accordingly, the network may determine a round-trip time the dedicated packet takes to traverse from the source node to the destination node and back to the source node.

Upon receiving the dedicated packet, the destination node may make the collected information available, for example, via polling by other nodes in the NoC. For example, the destination node may keep the dedicated packet until a network monitoring entity retrieves the packet from the destination node. According to aspects of the present disclosure, the destination node may send the dedicated packet and collected information to a central entity for processing. Thus, aspects of the present disclosure provide an on-line method (e.g., without taking the network offline) for a network to periodically gather network-level information.

Figure 3:
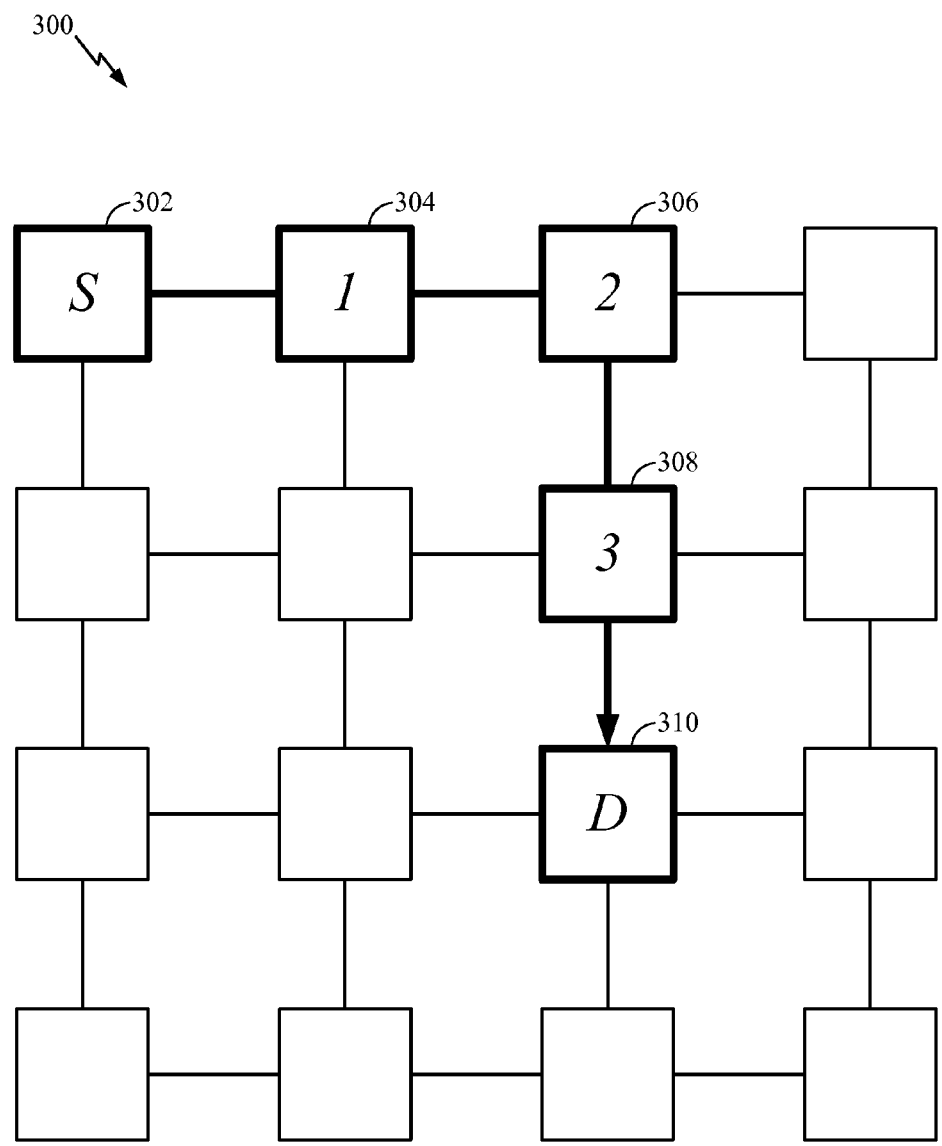
FIG. 3 illustrates an example route that a dedicated packet may follow as it traverses through a NoC in accordance with certain aspects of the present disclosure.

FIG. 3 illustrates an example route 300 a dedicated packet may traverse in a NoC, according to aspects of the present disclosure. Each of the plurality of interconnected nodes in the NoC may have a unique identifier.

The dedicated packet may begin traversing a route at a source node 302. As the dedicated packet travels from the source node 302 to a destination node 310, each node aware of the dedicated packet may append or prepend data to its payload along with its unique identifier.

As illustrated in FIG. 3, the dedicated packet may follow a route from node 1 304, to node 2 306, to node 3 308. Nodes 1-3 may be aware of the dedicated packet and may modify the payload of the dedicated packet. For example, modifying the payload of the dedicated packet may involve each node along the route adding their own information to the dedicated packet by appending or data and/or information to the payload. Node 3 308 may transmit the dedicated node to the destination node 310. As will be described in more detail below, the destination node 310 may be aware of the dedicated packet and may keep the packet or may transmit the packet to a central monitoring entity for further processing.

While not illustrated in FIG. 3, each of the nodes in the NoC may have one or more incoming and outgoing ports for receiving and transmitting traffic. For example, node 1 may have multiple incoming ports and a single outgoing port, node 2 may have a single incoming port and multiple outgoing ports, and node 3 may have multiple incoming and multiple outgoing ports. Thus, the NoC may have multiple redundant paths between nodes.

According to aspects of the present disclosure, dedicated packets may help detect failures in the NoC. Soft failures and hard failures may become more relevant as technology is scaled down on a NoC. As described herein, the NoC may account for such detected failures using one or more dedicated packets.

For example, the network may detect a failure in the route traversed by the dedicated packet. In response to the occurring failure, the network may actively probe one or more other routes using dedicated packets. Based on information received via probing one or more other routes, the network may re-configure the route traversed by the dedicated packet. Re-configuring the route may be performed in an effort to account for the failure.

Figure 4:
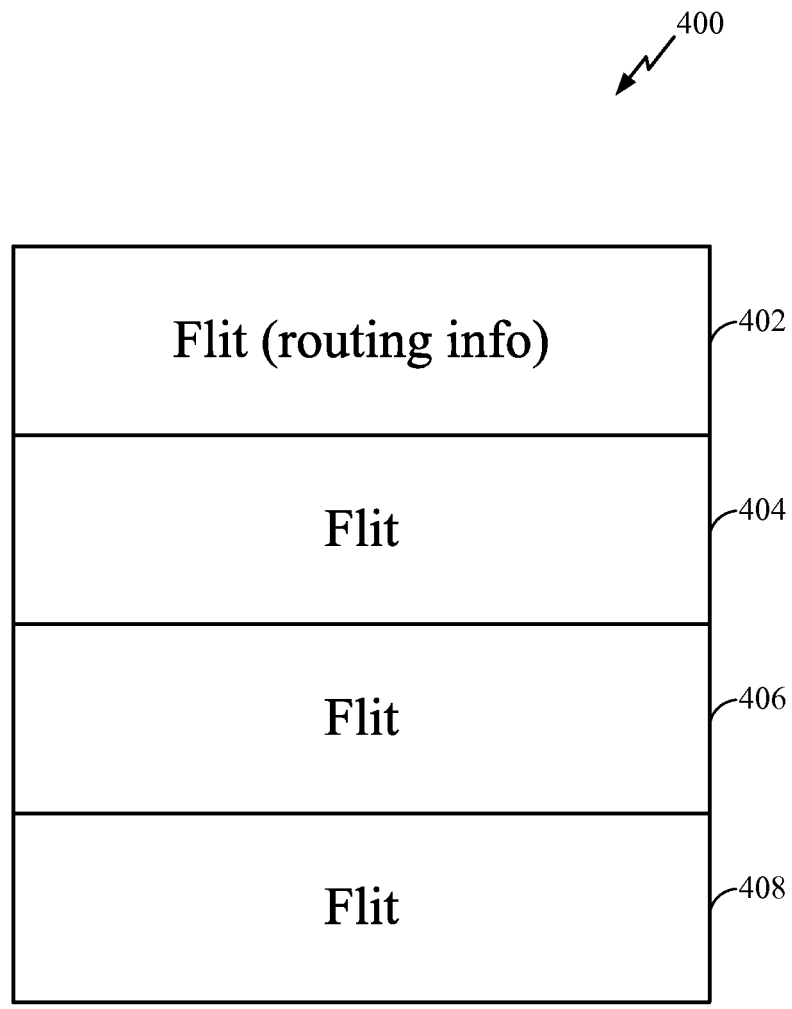
FIG. 4 illustrates an example dedicated packet that may traverse a NoC in accordance with certain aspects of the present disclosure.

FIG. 4 illustrates an example dedicated packet 400 that may traverse a NoC, according to aspects of the present disclosure. The dedicated packet may contain routing information 402 that the packet may follow as it traverses the NoC. As will be described with reference to FIG. 5, each node aware of the dedicated packet along its route may modify the payload of the dedicated packet. For example, one or more processing nodes may append data and/or information 404, 406, and 408 to the dedicated packet. A first node may append data 404, a second node may append data 406, and a third node may append data 408.

Figure 5:
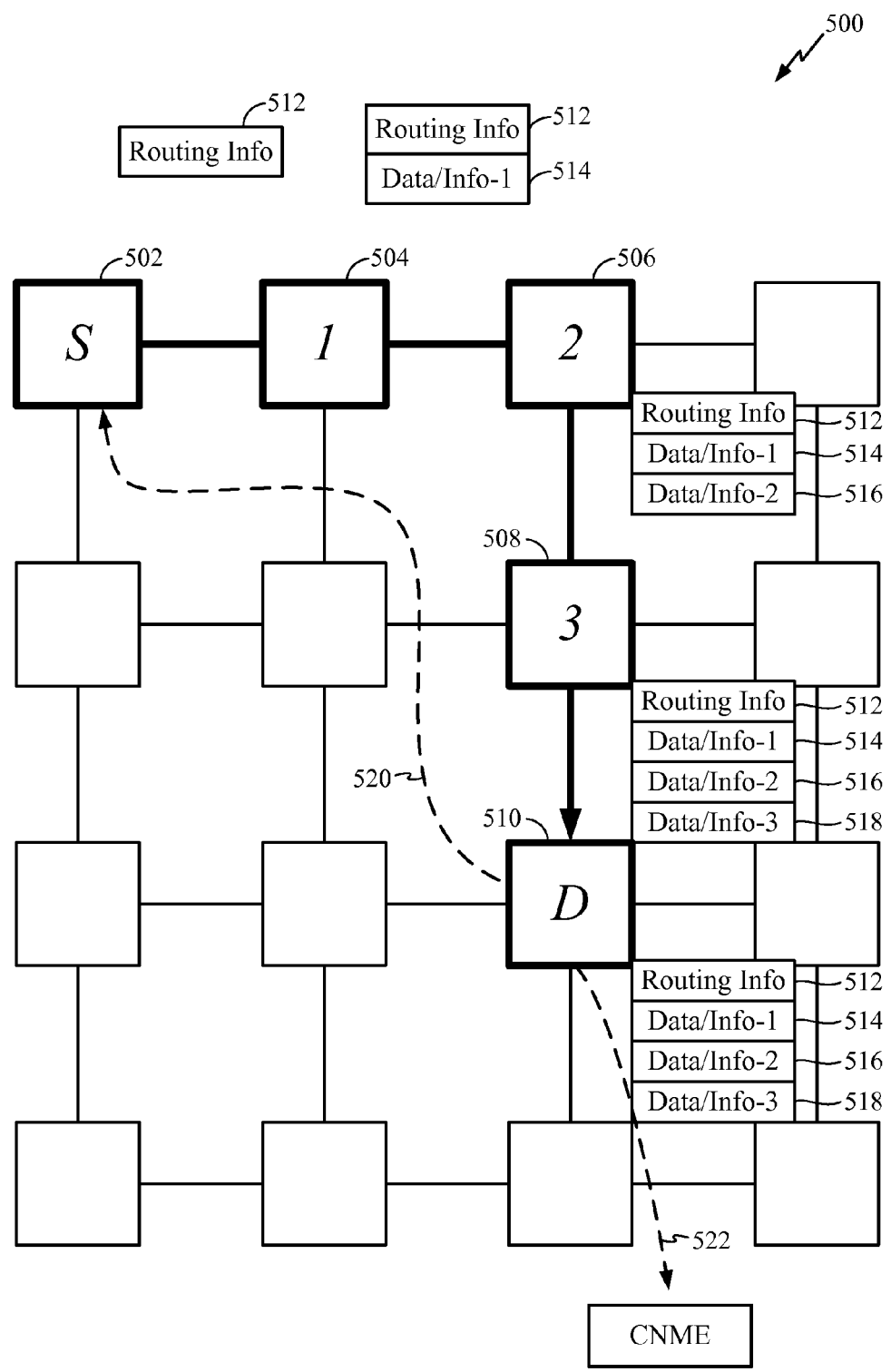
FIG. 5 illustrates a dedicated packet traversing through a NoC in accordance with certain aspects of the present disclosure.

FIG. 5 illustrates an example of a dedicated packet (e.g., dedicated packet 400 of FIG. 4) traversing a route on a NoC 500, according to aspects of the present disclosure. The dedicated packet may begin at a source node 502 and may pass intermediate nodes 1 504, node 2 506 and node 3 508 before reaching a destination node 510. Similar to FIG. 3, each of the nodes of NoC 500 may have one or more input and output ports for receiving and transmitting traffic.

At the source node 502, the dedicated packet may contain routing information 512 that the packet may follow as it travels through the NoC. The dedicated packet may pass through node 1 504. Node 1, which may be aware of the dedicated packet, may append or prepend data 514 to the dedicated packet. The dedicated packet may leave node 1 with the routing information 512 and data 514 of node 1 appended to its payload.

The dedicated packet may continue to travel through the NoC along the route specified by the routing information 512. The routing information may direct the dedicated packet to node 2 506. Similar to node 1 504, node 2 506 may append or prepend data 516 to the payload of the dedicated packet. When the dedicated packet leaves node 2 506, it may contain the routing information 512, data 514 appended by node 1 514, and data 516 appended by node 2.

As the data packet continues its route, it may pass through node 3 508. Node 3 508 may append or prepend its data 518 to the payload of the dedicated packet. Thus, when the dedicated packet leaves node 3 508, it may contain the routing information 512, data 514 appended by node 1, data 514 appended by node 2, and data 518 appended by node 3.

The data packet may continue to traverse its route according to its routing information 512. Nodes aware of the dedicated packet may modify the payload as described herein. At the end of the route, the data packet may reach its destination note.

The destination node 510 may receive the dedicated packet with collected information. The destination node 510 may know that the dedicated packet is a special type of packet, containing information from a traversed route. According to aspects of the present disclosure, a network monitoring entity may retrieve the dedicated packet with the collected information from the destination node 510 for data processing. In some aspects, the destination node 510 may send the dedicated packet to a central network monitoring entity (CNME) via route 522.

Each intermediate processing node 1-3 may time stamp the dedicated packet as it passes through the NoC in an effort to determine latency between nodes in the network. In addition, the source node and/or the destination node may timestamp the dedicated packet. According to aspects of the present disclosure, the destination node 510 may transmit the dedicated packet back to the source node 502 via route 520 in an effort to determine a round-trip flight of the dedicated packet.

Various nodes (e.g., 504, 506, 510) may initiate transmitting a dedicated packet through the NoC. For example, in an effort to debug the NoC, an intermediate processing node may transmit a dedicated packet, perform a desired task, and transmit a second dedicated packet to another intermediate node or a destination node. The central processing entity may retrieve both dedicated packets in an effort to better understand utilization statistics of the NoC.

Lost dedicated packets (e.g., dedicated packets which do not reach the destination node after a given amount of time) may be indicators of network loss or failure. A failure may occur, for example, when an intermediate node fails to response to a dedicated packet. When the destination node fails to receive a dedicated packet, the NoC may determine some type of failure has occurred. Accordingly, the payload of the dedicated packet may make failures more detectable by the network.

According to aspects of the present disclosure, dedicated packets may be used to demarcate one or more traffic flows of the NoC. A network node capable of handling a dedicated packet may take specific actions based, at least in part, on a number of incoming and outgoing ports of the node.

A multiple input, single output node may block traffic on each input port that receives a dedicated packet. The node may allow traffic on each of the incoming ports until that port receives a dedicated packet. The node may process the dedicated packets once each incoming port has received a dedicated packet. After processing the dedicated packet, the node may transmit a single dedicated packet on the single output port. By blocking incoming traffic on one or more incoming ports and transmitting a dedicated packet on an output port, the multiple input, single output node of the NoC may indicate to a receiver node that the incoming ports of the previous node are synchronized.

A single input, multiple output node, upon receiving a dedicated packet may replicate the dedicated packet for each output port of the node. After replicating the dedicated packet, the single input, multiple output node may transmit the replicated dedicated packet on each output port of the node.

A multiple input, multiple output node may behave similarly to both a multiple input, single output node and a single input, multiple output node. Accordingly, a multiple input, multiple output node may receive dedicated packets on each of the multiple incoming ports of the node. The node may block traffic for each incoming port that has received a dedicated packet. When traffic on all incoming ports has been blocked, the node may replicate the received dedicated packets for each output port of the node and may transmit each of the replicated dedicated packets on each of the output ports of the node.

By transmitting dedicated packets throughout a NoC, the network may self-synchronize data flows in a distributed manner (e.g., without use of a centralized controller).

According to aspects of the present disclosure, the dedicated packet may be used as a power state packet in an effort to allow the network nodes and/or paths to be put to sleep or to woken up depending on network conditions.

Thus, aspects of the present disclosure provide an on-line method for sweeping information, including network node statistics, from nodes of a NoC. Information collected by various network nodes modifying, appending and/or prepending data to the payload of or more dedicated packets may be used for failure detection and statistics collected in a NoC.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for collecting system information in a network on a chip (NoC) comprising a plurality of interconnected processing nodes, comprising:
generating a dedicated packet at a source node of the plurality of interconnected processing nodes of the NoC, wherein generating the dedicated packet comprises generating routing information for the dedicated packet;
transmitting the dedicated packet from the source node to a destination node of the plurality of interconnected processing nodes of the NoC traversing one or more intermediate nodes of the plurality of interconnected processing nodes of the NoC;
modifying the dedicated packet with collected information at at least one of the intermediate nodes as the dedicated packet traverses a route from the source node to the destination node according to at least the routing information, wherein modifying the dedicated packets comprises pre-pending, appending, or combination thereof of the dedicated packet with consumed resources information at the intermediate node; and
making the collected information of the dedicated packet available by the destination node, wherein the destination node makes the collected information available in response to a polling request by any node in the NoC other than the destination node.

2. The method of claim 1, wherein the destination node sends the collected information to a central entity for processing.

3. The method of claim 1, wherein the collected information at at least one of the intermediate nodes comprises queue statistics of the intermediate node, utilization per link at the intermediate node, bandwidth consumption of the intermediate node, processing time of the intermediate node, number of packet that have passed through the node, or combination thereof.

4. The method of claim 1, wherein the collected information of the dedicated packet available by the destination node comprises timestamps added by at least one of the source node or one or more of the intermediate nodes.

5. The method of claim 4, further comprising:
processing the collected information to determine a traversal time of the dedicated packet from the source node to the destination node.

6. The method of claim 4, further comprising:
determining one or more path delays between nodes based on the timestamps.

7. The method of claim 1, wherein the destination node transmits the dedicated packet back to the source node.

8. The method of claim 7, further comprising:
determining a round-trip time of the dedicated packet from the source node to the destination node and back.

9. The method of claim 1, wherein modifying the dedicated packet comprises:
modifying the dedicated packet with a unique node identifier at at least one of the intermediate nodes.

10. An apparatus for collecting system information in a network on a chip (NoC) comprising a plurality of interconnected processing nodes, comprising:
means for generating a dedicated packet at a source node of the plurality of interconnected processing nodes of the NoC, wherein generating the dedicated packet comprises generating routing information for the dedicated packet;
means for transmitting the dedicated packet from the source node to a destination node of the plurality of interconnected processing nodes of the NoC traversing one or more intermediate nodes of the plurality of interconnected processing nodes of the NoC;
means for modifying the dedicated packet with collected information at at least one of the intermediate nodes as the dedicated packet traverses a route from the source node to the destination node according to at least the routing information, wherein modifying the dedicated packets comprises pre-pending, appending, or combination thereof of the dedicated packet with consumed resources information at the intermediate node; and
means for making the collected information of the dedicated packet available by the destination node, wherein the destination node makes the collected information available in response to a polling request by any node in the NoC other than the destination node.

11. The apparatus of claim 10, wherein the destination node sends the collected information to a central entity for processing.

12. The apparatus of claim 10, wherein the collected information at at least one of the intermediate nodes comprises queue statistics of the intermediate node, utilization per link at the intermediate node, bandwidth consumption of the intermediate node, processing time of the intermediate node, number of packet that have passed through the node, or combination thereof.

13. The apparatus of claim 10, wherein the collected information of the dedicated packet available by the destination node comprises timestamps added by at least one of the source node or one or more of the intermediate nodes.

14. The apparatus of claim 13, further comprising:
means for processing the collected information to determine a traversal time of the dedicated packet from the source node to the destination node.

15. The apparatus of claim 13, further comprising:
means for determining one or more path delays between nodes based on the timestamps.

16. The apparatus of claim 10, wherein the destination node transmits the dedicated packet back to the source node.

17. The apparatus of claim 16, further comprising:
means for determining a round-trip time of the dedicated packet from the source node to the destination node and back.

18. The apparatus of claim 10, wherein the means for modifying the dedicated packet comprises:
means for modifying the dedicated packet with a unique node identifier at at least one of the intermediate nodes.

19. An apparatus for collecting system information in a network on a chip (NoC) comprising a plurality of interconnected processing nodes, comprising:
a processing unit configured to:
generate a dedicated packet at a source node of the plurality of interconnected processing nodes of the NoC, wherein generate the dedicated packet comprises generate routing information for the dedicated packet;
transmit the dedicated packet from the source node to a destination node of the plurality of interconnected processing nodes of the NoC traversing one or more intermediate nodes of the plurality of interconnected processing nodes of the NoC;

modify the dedicated packet with collected information at at least one of the intermediate nodes as the dedicated packet traverses a route from the source node to the destination node according to at least the routing information, wherein modifying the dedicated packets comprises pre-pending, appending, or combination thereof of the dedicated packet with consumed resources information at the intermediate node; and make the collected information of the dedicated packet available by the destination node, wherein the destination node is configured to make the collected information available in response to a polling request by any node in the NoC other than the destination node.

20. The apparatus of claim 19, wherein the destination node is configured to send the collected information to a central entity for processing.

21. The apparatus of claim 19, wherein the collected information at at least one of the intermediate nodes comprises queue statistics of the intermediate node, utilization per link at the intermediate node, bandwidth consumption of the intermediate node, processing time of the intermediate node, number of packet that have passed through the node, or combination thereof.

22. The apparatus of claim 19, wherein the collected information of the dedicated packet available by the destination node comprises timestamps added by at least one of the source node or one or more of the intermediate nodes.

23. The apparatus of claim 22, wherein the processing unit is further configured to:
process the collected information to determine a traversal time of the dedicated packet from the source node to the destination node.

24. The apparatus of claim 22, wherein the processing unit is further configured to:
determine one or more path delays between nodes based on the timestamps.

25. The apparatus of claim 19, wherein the destination node is configured to transmit the dedicated packet back to the source node.

26. The apparatus of claim 25, wherein the processing unit is further configured to:
determine a round-trip time of the dedicated packet from the source node to the destination node and back.

27. The apparatus of claim 19, wherein the processing unit is configured to modify the dedicated packet by modifying the dedicated packet with a unique node identifier at at least one of the intermediate nodes.

28. A computer-program product for collecting system information in a network on a chip (NoC) comprising a plurality of interconnected processing nodes, the computer-program product comprising a non-transitory computer-readable medium having instructions executable to:
generate a dedicated packet at a source node of the plurality of interconnected processing nodes of the NoC, wherein generate the dedicated packet comprises generate routing information for the dedicated packet;
transmit the dedicated packet from a source node to the destination node of the plurality of interconnected processing nodes of the NoC traversing one or more intermediate nodes of the plurality of interconnected processing nodes of the NoC;
modify the dedicated packet with collected information at at least one of the intermediate nodes in the NoC as the dedicated packet traverses a route from the source node to the destination node according to at least the routing information, wherein modifying the dedicated packets comprises pre-pending, appending, or combination thereof of the dedicated packet with consumed resources information at the intermediate node; and
make the collected information of the dedicated packet available by the destination node, wherein the destination node makes the collected information available in response to a polling request by any node in the NoC other than the destination node.

29. The computer-program product of claim 28, wherein the destination node sends the collected information to a central entity for processing.

30. The computer-program product of claim 28, wherein the collected information at at least one of the intermediate nodes comprises queue statistics of the intermediate node, utilization per link at the intermediate node, bandwidth consumption of the intermediate node, processing time of the intermediate node, number of packet that have passed through the node, or combination thereof.

31. The computer-program product of claim 28, wherein the collected information of the dedicated packet available by the destination node comprises timestamps added by at least one of the source node or one or more of the intermediate nodes.

32. The computer-program product of claim 31, further comprising instructions executable to:
process the collected information to determine a traversal time of the dedicated packet from the source node to the destination node.

33. The computer-program product of claim 31, further comprising instructions executable to:
determine one or more path delays between nodes based on the timestamps.

34. The computer-program product of claim 28, wherein the destination node transmits the dedicated packet back to the source node.

35. The computer-program product of claim 34, further comprising instructions executable to:
determine a round-trip time of the dedicated packet from the source node to the destination node and back.

36. The computer-program product of claim 28, wherein the instructions executable to modify the dedicated packet comprise instructions for modifying the dedicated packet with a unique node identifier at at least one of the intermediate nodes.

* * * * *